United States Patent [19]
Scharf

[11] Patent Number: 5,717,529
[45] Date of Patent: Feb. 10, 1998

[54] CONTROLLABLE HORIZON DIAPHRAGM FOR PLANETARIA

[75] Inventor: Klaus-Dieter Scharf, Jena, Germany

[73] Assignee: Carl Zeiss Jena GmbH, Jena, Germany

[21] Appl. No.: 561,817

[22] Filed: Nov. 22, 1995

[30] Foreign Application Priority Data

Nov. 23, 1994 [DE] Germany .................. 9418715 U

[51] Int. Cl.$^6$ .................. G02B 7/00; G09B 23/00
[52] U.S. Cl. .................. 359/739; 359/822; 434/286
[58] Field of Search .................. 359/739, 822; 434/286

[56] References Cited

U.S. PATENT DOCUMENTS 5,194,009  3/1993  Bertsche ........................ 353/62

*Primary Examiner*—Scott J. Sugarman
*Attorney, Agent, or Firm*—McAulay Fisher Nissen Goldberg & Kiel, LLP

[57] ABSTRACT

A controllable horizon diaphragm for planetaria with a housing and a cup-shaped diaphragm arranged in the beam path of a lens projecting fixed star transparencies into a dome. The controllable horizon diaphragm comprises a housing, a first and second bevel gear and a bearing ring. The housing, bevel gears and bearing rings are supported so as to be rotatable about an optical axis of the projecting lens. Separate driving devices drive each of the first and second bevel gears. The driving devices are coupled to a control unit. A third bevel gear is included which is rotatable about an axis extending vertically to the optical axis supported in the bearing ring. The diaphragm has a diaphragm body which is arranged at the third bevel gear in a stationary manner. The third bevel gear engages with the first and second bevel gears.

12 Claims, 2 Drawing Sheets

CONTROLLABLE HORIZON DIAPHRAGM FOR PLANETARIA

BACKGROUND OF THE INVENTION a) Field of the Invention

The invention is directed to a controllable horizon diaphragm for planetaria and, more particularly, to planetaria having a housing and a cup-shaped diaphragm arranged in a beam path of the lens projecting the fixed-star transparencies onto the dome.

b) Description of the Related Art

In planetaria working on the principle of projection, the fixed stars are first projected in all directions onto the dome of the planetarium by a central fixed-star projector of a fixed-star globe or two fixed-star half-globes. When projecting the horizon, projection below the respective horizon must be prevented regardless of the rotation of the fixed-star globe in order to avoid subjecting the spectators to glare, in classic planetaria with horizontal domes in which the horizon extends horizontally, the light beams reaching below the horizon are shut off by diaphragms which are arranged in front of the projection lens and are always set horizontally by the action of the force of gravity.

Such diaphragm control devices are known from DD-PS 142 616, DD-PS 125 540, DD-PS 203 992, and DE-GM 85 08 978. In these devices, a diaphragm ring supporting a diaphragm is rotated by means of a mass which is acted upon by the force of gravity and is movable between two stops. For example, a sleeve filled with mercury or a ball supported in guides of the diaphragm ring is used as such a mass. A disadvantage in these devices consists in that such diaphragm control devices which rely on the force of gravity cannot be used in sloping domes.

In planetaria outfitted with sloping domes, the fixed-star projectors are arranged on fixed-star globes. Such devices are known from Meier, L., "Der Himmel aus Erden—Die Welt der Planetarien", Johann Ambrosius Barth Verlag, Leipzig, Heidelberg, 1992, pages 67 to 69). Two different diaphragm arrangements are used to shut off the rays depending on the projection system employed. In a planetarium using a hole projection system for projecting fixed stars, a sheet-metal sleeve is arranged around the fixed-star globe in the inclined plane. In another planetarium in which the fixed-star transparencies are projected onto the inner surface of the dome by optical systems, venetian-blind-type constructions comprising many small, upwardly inclined sheet-metal strips are arranged around the fixed-star globe. A drawback in these diaphragm arrangements consists in that, in the event that a different horizon setting is desired, they can be modified in a controllable manner only at considerable technical cost. They are also expensive to manufacture.

A horizon diaphragm which is arranged within a lens projecting the fixed-star transparencies onto the dome of a planetarium and which is adjusted by the action of the force of gravity on a mass is known from Hagar, Charles F., "Planetarium—Window to the Universe", C. Maurer, Druck und Verlag, Geislingen /Steige, 1980, page 34). This horizon diaphragm likewise has the disadvantages of the other known diaphragms.

Further, a fixed-star projector which has 32 projection lenses and uses computer-controlled horizon diaphragms is known from the publication by GOTO OPTICAL MFG. Co., Tokyo, Japan, "GOTO SPACE THEATER".

A controllable horizon diaphragm for planetaria which works independently from the force of gravity and which is suitable for use in sloping domes is known from DE-PS 43 26 260. It suffers from increased wear, especially at the leaves and leaf pins.

OBJECT AND SUMMARY OF THE INVENTION

The primary object of the present invention is to provide a controllable horizon diaphragm for planetaria at low cost and in a compact construction without the use of slip rings for transmission of energy by means of which the height of the horizon, as well as its inclination, can be adjusted optionally and with high precision and which can be arranged at different locations on the respective lens.

According to the invention, this object is met by an apparatus for a controllable horizon diaphragm comprising a housing, a first and second bevel gear and a bearing ring. The housing, bevel gears and bearing rings are supported so as to be rotatable about an optical axis of the projecting lens. Separate driving devices drive each of the first and second bevel gears. The driving devices are coupled to a control unit. A third bevel gear is included which is rotatable about an axis extending vertically to the optical axis supported in the bearing ring. The diaphragm has a diaphragm body which is arranged at the third bevel gear in a stationary manner. The third bevel gear engages with the first and second bevel gears.

The horizon diaphragm according to the invention which is associated with each of the lenses projecting the individual fixed-star transparencies onto the dome of the planetarium has the particular advantage that the axis of rotation of the cap-shaped diaphragm need not lie at the entrance pupil or exit pupil of the respective lens. A further advantage consists in that the horizon diaphragm can be arranged in relation to the lens in such a way that the diaphragm acts between the transparency and the lens or, optionally, downstream of the exit pupil. This enables a variable positioning of the horizon diaphragm in relation to the lens depending on the respective spatial conditions on the projector globes or projector half-globes of the planetarium projector.

In the following, the invention will be explained more fully with reference to an embodiment example.

DESCRIPTION OF THE PREFERRED EMBODIMENTS

Figure 1:
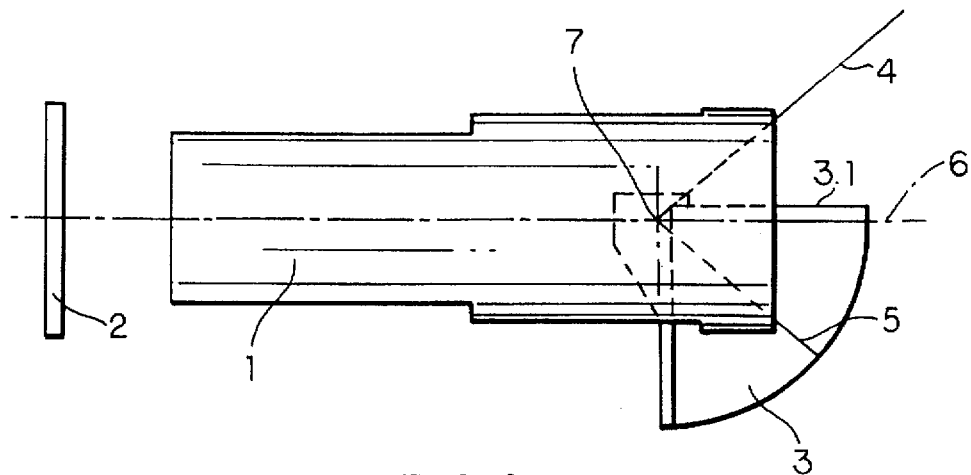
FIG. 1 shows a highly schematic arrangement of the diaphragm body at the lens.

FIG. 1 shows a lens 1 and a star transparency or a star plate 2 which is arranged upstream of the lens 1 in the direction of light and is illuminated by an illumination device, not shown. A diaphragm body 3 which preferably has a cap-shaped design and a diaphragm edge 3.1 and is supported so as to be rotatable about an axle 7 restricts the beam path of the projector depending on its adjustment. The diaphragm body 3 can have, e.g., a spherical shape or a different surface of a higher order. The edge 3.1 of the diaphragm body 3 can either lie in a plane or be spatially curved. The possible region in which the beam path exiting from the lens 1 can be restricted is defined by lines 4 and 5 in FIG. 1. The optical axis of the lens 1 is designated by 6.

Figure 2:
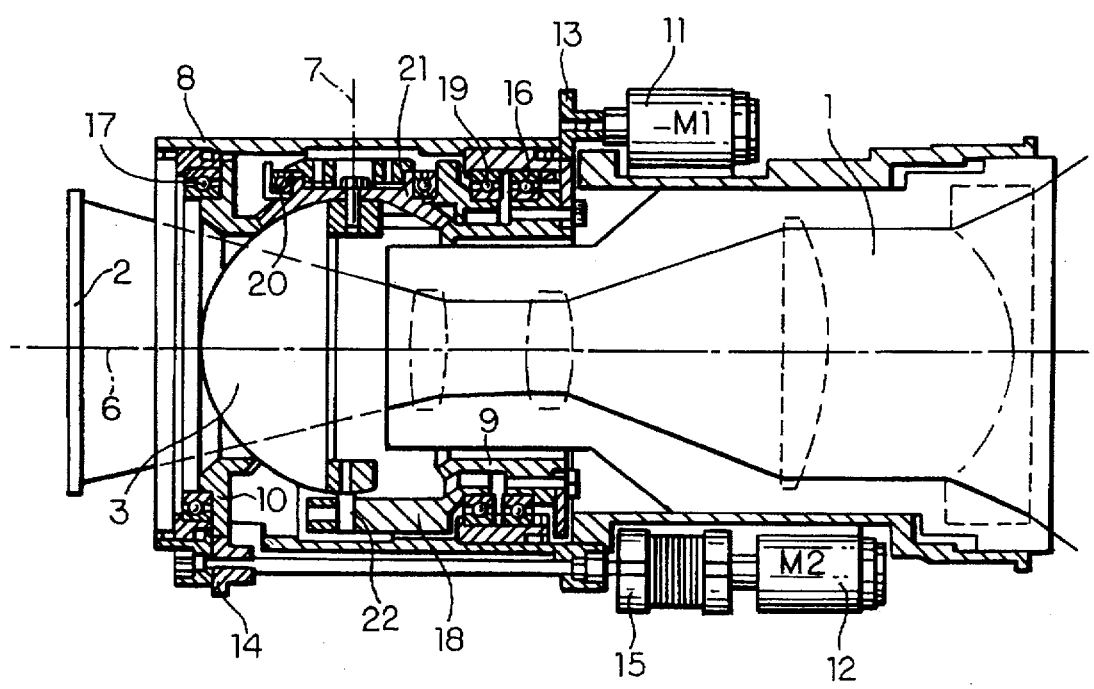
FIG. 2 shows a section through a horizon diaphragm constructed as an inner diaphragm.

The controllable horizon diaphragm for planetaria according to the invention which is shown in section in FIG. 2 has a housing 8 in which a first and a second bevel gear 9 and 10 are supported so as to be rotatable about the optical axis 6. A driving device 11 and 12 is provided in each instance for driving each of these bevel gears 9 and 10. For example, bevel gear 9 is driven via transmission means, e.g., toothed wheels 13, by driving device 11 and bevel gear 10 is driven by driving device 12, e.g. via a coupling 15 and a toothed wheel 14. The teeth of these toothed wheels 13 and 14 mesh with a spur gear toothing at the bevel gears 9 and 10.

A control device or a control computer (not shown in the drawings) are provided for controlling the driving movement with respect to the direction and speed of rotation, the driving devices 11 and 12 being connected therewith. Rolling bearings 16 and 17 are provided for achieving a smooth or easy-running support of the bevel gears 9 and 10 in the housing 8 without play.

Further, in the housing 8, a bearing ring 18.is arranged in the rolling bearings 19 so as to be rotatable about the optical axis 6, a third bevel gear 21 being supported in rolling bearings 20 at the bearing ring 18. This bevel gear 21 is rotatable about an axis 7 vertically to the optical axis 6 and engages with the first bevel gear 9 and the second bevel gear 10. The bevel gears 9 and 10 can be provided with teeth on their conical surface which mesh with corresponding teeth on the third bevel gear 21. In principle, the three bevel gears 9, 10 and 21 can also be constructed as friction wheels. In this case, the conical surface of each bevel gear 9, 10 and 21 is advantageously covered by a suitable friction lining.

The cap-shaped diaphragm body 3 is arranged in a stationary manner at the third bevel gear 21 so that it can be adjusted jointly with bevel gear 21 depending on the driving ratios in relation to the axis 7 and the optical axis 6. The diaphragm body 3 is supported by a pivot or trunnion 22 in the bearing ring 18 on the side located diametrically opposite the bevel gear 21 for purposes of support.

The bevel gears 9 and 10 and the bearing ring 18 are constructed so as to be hollow in their central region around the optical axis 6 in such a way that the respective lens beam path or projection beam path can be guided centrally through the bevel gears 9 and 10 and the bearing ring 18.

Figure 3:
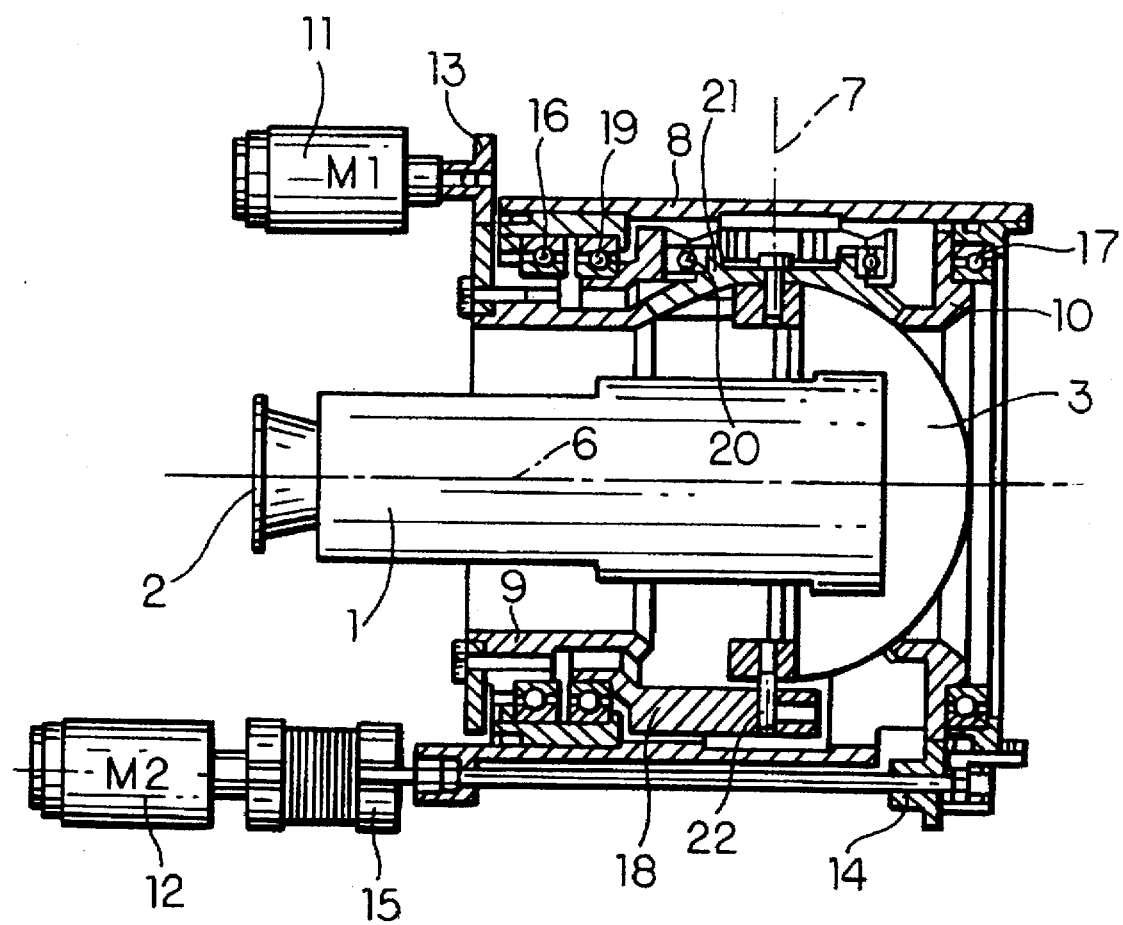
FIG. 3 shows a section through a horizon diaphragm constructed as an outer diaphragm.

FIG. 2 shows a controllable horizon diaphragm whose diaphragm body 3 can be arranged in the beam path between the star plate 2 to be projected and the entrance pupil of the projecting lens 1. The diaphragm body 3 in this arrangement functions as an inner diaphragm in contrast to the arrangement shown in FIG. 3 in which the diaphragm body 3 can be arranged in the beam path as an outer diaphragm outside, i.e., upstream of, the exit pupil of the lens 1.

The manner of operation of the controllable horizon diaphragm is described in the following.

When both bevel gears 9 and 10 are driven by the driving devices 11 and 12 at the same angular velocity and in the same direction of rotation, the diaphragm body 3 restricting the beam path remains in the adjusted degree of opening. It moves only about the optical axis 6.

However, when bevel gears 9 and 10 rotate at the same angular velocity in opposite directions, the diaphragm body 3 is rotated about the axis 7 by its edge 3.1 and opens and closes the beam path. In so doing, the axis 7 is not rotated about the optical axis 6.

If both bevel gears 9 and 10 are driven by the driving devices 11 and 12 at different angular speeds and in different or identical rotating directions, a combined adjustment of the diaphragm body 3 is effected in such a way that rotation is carried out about the optical axis 6 and about the axis 7.

By means of the horizon diaphragm according to the invention, the diaphragm body 3 can be adjusted in all possible positions by a suitably controlled rotation of the bevel gears 9 and 10, so that it can also be used in a planetarium with a sloping dome.

While the foregoing description and drawings represent the preferred embodiments of the present invention, it will be obvious to those skilled in the art that various changes and modifications may be made therein without departing from the true spirit and scope of the present invention.

What is claimed is:

1. A controllable horizon diaphragm for fixed-star projectors in planetaria with a lens projecting fixed-star transparencies onto a dome, comprising:

a housing;

a cap-shaped diaphragm arranged in a beam path of said lens;

a first and a second bevel gear;

a bearing ring, said bearing ring, said housing, and first and second bevel gears being supported so as to be rotatable about an optical axis of said respective lens;

separate driving devices for driving each of said first and second bevel gears, said driving devices being coupled to a control unit; and, a third bevel gear which is rotatable about an axis extending vertically to said optical axis being supported in said bearing ring;

wherein, said cap-shaped diaphragm is arranged at said third bevel gear in a stationary manner; and said third bevel gear engages said first and second bevel gears.

2. The controllable horizon diaphragm according to claim 1, wherein said bevel gears comprise conical toothed wheels.

3. The controllable horizon diaphragm according to claim 1, wherein said bevel gears comprise friction wheels having a friction surface.

4. The controllable horizon diaphragm according to claim 1, wherein said diaphragm body is constructed in the shape of a cap and includes an edge which lies in a plane.

5. The controllable horizon diaphragm according to claim 1, wherein said diaphragm body is constructed in the shape of a cap and includes an edge which is spatially curved.

6. The controllable horizon diaphragm according to claim 1, wherein said first and second bevel gears and said bearing ring are rotatably supported in bearings inside the housing, and wherein said bevel gears and said bearing ring are constructed so as to be hollow in the region around said optical axis of said lens so that the respective lens beam path can be guided through said bevel gears and said bearing ring.

7. The controllable horizon diaphragm according to claim 1, wherein said first and said second bevel gear are drivable by said respective driving device associated therewith independently from one another with respect to their angular velocity and rotating direction.

8. The controllable horizon diaphragm according to claim 1, wherein the horizon diaphragm, including its housing, is arranged at a housing of the respective associated lens.

9. The controllable horizon diaphragm according to claim 1, wherein said driving devices are d.c. drives which are controllable by a control device.

10. The controllable horizon diaphragm according to claim 1, wherein said driving devices are stepper motors which are controllable by a control device.

11. The controllable horizon diaphragm according to claim 1, wherein said devices are d.c. drives which are controllable by a control computer.

12. The controllable horizon diaphragm according to claim 1, wherein said driving devices are stepper motors which are controllable by a control computer.

* * * * *